United States Patent [19]
Schorr et al.

[11] Patent Number: 4,794,240
[45] Date of Patent: Dec. 27, 1988

[54] BAR CODE SCANNER CONSTRUCTION

[75] Inventors: Theodore H. Schorr; James J. Jensen, both of Eugene, Oreg.

[73] Assignee: Spectra-Physics, Inc., San Jose, Calif.

[21] Appl. No.: 907,339

[22] Filed: Sep. 12, 1986

[51] Int. Cl.$^4$ ............................................. G06K 7/14
[52] U.S. Cl. .................................. 235/467; 235/462; 350/6.8; 350/631
[58] Field of Search ...................... 235/435, 462, 467; 350/6.5, 6.8, 631

[56] References Cited

U.S. PATENT DOCUMENTS

| | | | |
|---|---|---|---|
| 3,978,317 | 8/1976 | Yamaguchi et al. | 235/467 |
| 4,006,343 | 2/1977 | Izura et al. | 235/467 |
| 4,064,390 | 12/1977 | Hildebrand et al. | 235/467 |
| 4,632,500 | 12/1986 | Fetzer | 350/6.5 |
| 4,720,824 | 1/1988 | Hayashi | 235/487 |

Primary Examiner—A. D. Pellinen
Assistant Examiner—Jeffrey A. Gaffin
Attorney, Agent, or Firm—Donald C. Feix; Paul Davis; T. M. Freiburger

[57] ABSTRACT

A housing construction for a POS type bar code scanner with multiple apparent source scan geometry includes only two main housing components. Each a casting to which one or a number of routing mirrors are bonded so as to precisely locate the plane of each mirror. The routing mirrors are bonded to the castings preferably on spherical ball type locaters integral with the castings, and their positions are non-adjustable. Other mirrors and collection optics are also retained on the lower and the upper casting. For precisely locating the two castings with respect to each other upon assembly, the castings have three-point contact, coupled with casting bores and removable fasteners with shoulders of precise diameter, so that the relative casting positions are accurately located as to both tilt and lateral shifting. The spherical ball locating devices for the mirrors are positioned, on each of the two castings, with reference to the precision-located connection bores and contact points on that housing.

23 Claims, 8 Drawing Sheets

BAR CODE SCANNER CONSTRUCTION

BACKGROUND OF THE INVENTION

The invention relates to optical bar code readers, and more particularly to stationary bar code readers with multiple apparent source scan geometry.

Typical scanning devices for bar code readers of the prior art, particularly POS (point of sale) scanners, have consisted of three separate die cast parts. To assemble these three castings together generally required special assembly tooling which would locate a relatively large number of connection points relative to additional connection points, between castings. Precision in such assemblies is required in order to achieve uniform and consistent scan geometry.

In general, two methods have been employed in the past for assembly of such castings in POS scanners. One method involved machining and pinning castings together, while another involved shimming various connection points to compensate for casting variations. Either method amounted to a costly and time consuming process in comparison with the present invention.

Partitioning of an optics cavity in scanners of the prior art has usually been accomplished by fitting at least three separate castings together. The fits need to be extremely uniform to assure sealing integrity, as well as to verify that the three castings have been assembled properly.

In prior POS or similar type scanners, there were sometimes included a number of adjustable mirrors, such as six, by which the scan geometry was achieved. The mirrors were required to be adjusted so that desired scan segments would pass accurately through slotted insert apertures in the deck of the scanner. To achieve the required adjustments, there were often included a large number of spring clips and set screws accessible from the outside of the assembled scanner. Such adjustments comprised the second of two alignment sequences for such scanners.

Mirror attachment techniques according to prior practice require some flexibility in adhesives used to hold the mirrors in place and to provide mechanical hinges. Because of multiple alignment iterations involved in these prior mirror attachment procedures, the cure times involved with the bonding agents between succeeding steps could appreciably slow the assembly process.

For universality of application, POS scanning devices require multiple interfaces to other POS equipment, as well as four different power options for different geographical areas of the world. To provide different interfaces requires unique interface boards and cabling which have been accessible only with considerable disassembly in most prior scanners. Changing of interfaces has often required that various covers and voltage shields, as well as the main circuit board, be removed before access to the interfacing printed circuit board can be made. The various connectors have needed to be disconnected.

In deck tops of many prior POS type scanners, a plastic top cover was used on the deck in connection with an upper plastic window. Moisture seals are required for the optics cavity, including at this upper plastic window. When the plastic window requires replacing, this was usually not capable of accomplishment by the user while still maintaining the moisture seal. Further, the plastic windows have been vulnerable to scratches caused by items coming into contact with the window, even through slotted inserts. Scratching will greatly diffuse and attenuate the beam, reducing efficiency and reliability, so that plastic windows of prior scanners have often required relatively frequent replacement.

SUMMARY OF THE INVENTION

In accordance with the present invention, a POS bar code scanner has a housing construction in which only two castings support all of the optical components of the system. All beam routing mirrors, whose position and orientation are critical, are fixedly and non-adjustably mounted on the two castings. For precise orientation of the plane of the mirrors, spherical (or generally spherical) ball mounts, preferably integral with the casting, are positioned for receiving the back side of each mirror. Three spherical ball locators are used for each mirror.

The scanner in accordance with a preferred embodiment of the present invention is of very shallow depth profile, and may be as shallow as 11.5 centimeters. The two castings which support all of the optics of the scanner are configured so that assembly is accomplished without precision tooling or unnecessary machining, pinning or shimming to achieve uniform and consistent scan geometry. Each of the two castings includes three cast surfaces or contact points which are precision controlled as to location and which mate together on assembly. Further, the two castings are held together with shoulder bolts which fit in precise bores of the two castings for precision of location with respect to relative lateral shifting of the two castings.

The use of the cast-in mirror locating features, i.e. the spherical ball locating contacts, assures proper scan geometry when the mirrors are installed and when the castings are assembled together. This eliminates the need for a second alignment sequence, since the mirror mounting points are precisely located relatively to cast mounting features described above, i.e. the three contact points and bore locations on each casting.

In accordance with the invention, mirror attachment at the mirror locating devices is achieved by a fast curing epoxy and reinforced by a slower drying RTV for long-term retention. This allows completion of assembly without excess staging times for adhesives to cure.

The two-casting scanner construction of the invention includes features which allow the quick changing of an interface printed circuit board. Only one cover need be removed to gain access to the interface board. By removing only a few fasteners, the interface board can be removed without disassembly of the entire electronics package. The board is allowed to rotate out of the scanner because the electronic connection between this board and a main printed circuit board is achieved by one 90° angled-multi-pin connector. This saves time in manufacture and makes the changing of interfaces by the customer very simple.

In the scanner of the invention, the main printed circuit board includes two switches and circuitry for accommodating any of the four different power options required for different locations in the world. Thus, there is no need to change any components to accommodate any different power specifications.

In the scanner of the invention, the scanning optics cavity is partitioned in accordance with the two casting design, with partitioning located to allow easy access for sealing of the optics cavity. Proper assembly of the scanner is achieved much more easily with the two-casting configuration of the present invention, as compared to the prior art, and the scanner is generally more easily manufactured.

In the top deck of the scanner, a molded plastic cover (secured to the top of the upper casting) is used in conjunction with a rubber molded gasket to provide a secondary moisture seal of the optics cavity. The window assembly preferably includes a sealed plastic lower window and a sealed glass upper window, which is held in place by friction and can easily be replaced by the user with the use of a small suction cup. The molded plastic top cover is held in place on the upper casting with a series of screws around the window opening. The ends of the cover preferably are secured in place with a specially designed extrusion which allows the plastic to thermally expand or contract without permanent damage to the cover.

In accordance with the invention, the window assembly provides a simple rectangular transparent opening, undivided, without slots for individual scan lines. The upper window is substantially flush with the plastic top cover, so that the scanner has a top surface or deck which is completely flat, except for a slight recessing of the upper window with respect to the plastic top cover.

Because the upper window is required to be part of the top deck surface in accordance with the construction of the invention, it must be abrasion resistant, user replaceable and relatively inexpensive. To this purpose, the window preferably comprises tempered tin oxide coated glass. The coated glass has transmission values in excess of 80% for 632 nm laser light and reflects lower wavelength ambient light, which is ideal for scanning applications. The monolithic tin oxide coating provides good abrasion resistence and will provide a relatively long life in normal scanning applications before replacement is needed.

Accordingly, in one embodiment of the invention a bar code scanner housing construction for a multiple apparent source scan geometry with multiple intersecting scan lines includes only two casting to which all the beam routing mirrors of the scanner are secured. The two castings comprise a platform or bottom casting and a main or upper casting, securable together by removable fasteners. Each casting has three-point spherical ball locating means for locating the plane of each beam routing mirror on the casting, with the back side of the beam routing mirror being bonded to the spherical ball locating means. The spherical ball locators are themselves precisely located with respect to three contact points on the respective casting. These contact points are located for contact with complementary contact points similarly located on the other casting. Together, these contact points precisely locate the castings together with respect to tilt orientation.

In conjunction with the three contact points of each casting, there are included position locating means for precisely locating the two castings together with respect to relative slidable movement or lateral shifting of the two castings, i.e. in a plane containing the three contact points.

The invention also encompasses a method of producing and assembling a bar code scanner of the type within the principles of the invention. The method includes forming the two castings, each with precision locating means for one or more routing mirrors, locating each of the mirror locating features by reference to three reference points on the respective casting, i.e. the three contact points and shoulder-bolt bores, and positioning the optics and fixing the routing mirrors in place so that first and second sets of mirrors can all be aligned properly upon assembly of the two castings, so that no adjustment of these mirrors is necessary.

In accordance with one preferred embodiment of the invention, the main or upper casting includes, for "five-apparent-source" scanning geometry, two pattern mirrors, two vertical mirrors, a folding mirror, a center horizontal mirror, and a rotating polygon mirror. The platform or lower casting of the preferred embodiment includes laser mounts for the laser (preferably a laser tube), two beam directing mirrors, a beam power attenuator adjustable from outside the scanner, a collection mirror, a bifocal lens, a meniscus lens and attached photodetector, and a bottom horizontal or final routing mirror.

It is therefore among the objects of the invention to simplify the construction of a POS type bar code scanner assembly, particularly in the context of a shallow profile scaneer, and to assure integrity of scanning geometry without the need for mirror adjustment, while also providing a number of additional features which add to efficiency of manufacture, versatility and ease of maintenance by the end user.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent princiiplss may be used and structural changes may be made as desired by those skilled in the art without depariing from the present invention and the purview of the appended claims.

DESCRIPTION OF THE PREFERRED EMBODIMENT

Figure 1:
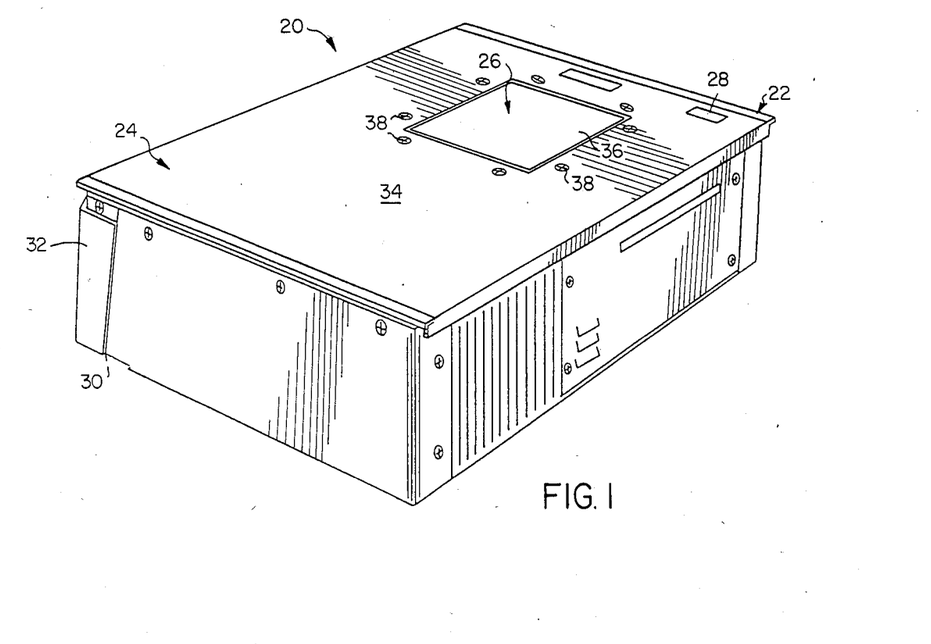
FIG. 1 is a perspective view showing a POS-type bar code scanner housing construction in accordance with the invention, in assembled configuration.

In the drawings, FIG. 1 shows a POS type bar code scanner 20 preferably of shallow profile height, as described in copending application Ser. No. 06/907,292, filed September 12, 1986 and assigned to the same assignee as the present invention. The scanner 20 includes a housing generally indicated as 22 and a top deck 24 with a preferably slotless scanner window 26. An indicator light 28 (or two lights, green and red) may be included to visually signal "good read" and "bad read".

In accordance with the invention, the scanner housing 22 is assembled from two major components to which all beam routing mirrors are permanently bonded: a platform or lower casting 30 (better seen in later views) and a main or upper casting 32, both of which are preferably aluminum die castings.

As also shown in FIG. 1, the top deck preferably is almost completely flat and flush, and includes a covering surface 34 which may be ABS plastic, with a window opening within which an upper window plate of glass 36 of the window assembly 26 is positioned. Around the window a series of screws or bolts 38 secure the plastic deck to the main or upper casting 32 immediately below, as also seen in FIG. 2

Figure 2:
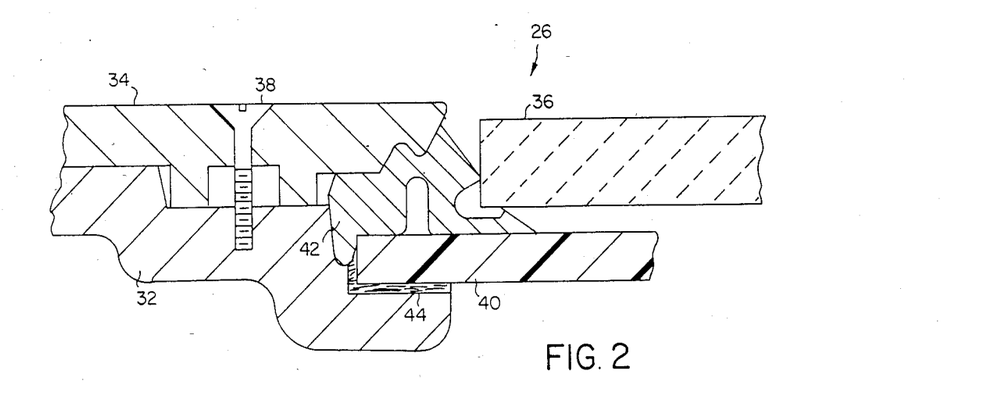
FIG. 2 is a detail view in section, as seen along the line 2—2 in FIG. 1, showing retention of a scan window in place in a top deck of the scanner.

In FIG. 2 a preferred window construction and retention system is illustrated. The window assembly, generally indicated as 26, preferably includes a lower plastic window 40 as well as the upper glass window 36. The lower window may be SAR acrylic, while the upper window is tin oxide coated, fully tempered glass, with high transmission values for 632 nm light as discussed above. The tin oxide coating provides considerable resistance to scratching as products are moved through the scan volume above the window, often touching the window 36 as they are moved.

The resilient gasket 42 extending around the window assembly 26 is compressed between the ABS plastic top cover 34 and the main or upper casting 32, retained in position by the screws or bolts 38 as shown. The gasket 42 seals against the upper glass window 36 and the lower plastic window 40, as well as against the upper casting 32 and the plastic cover 34. It is important that the optics inside the scanner 20 be sealed against intrusion of dust and other particles and against humidity changes.

In addition, a gasket material 44 preferably is included for seating and sealing against the lower plastic window 40, as shown in FIG. 2, so that it does not contact the hard surface of the upper casting 32 directly and to aid in sealing.

Figure 3:
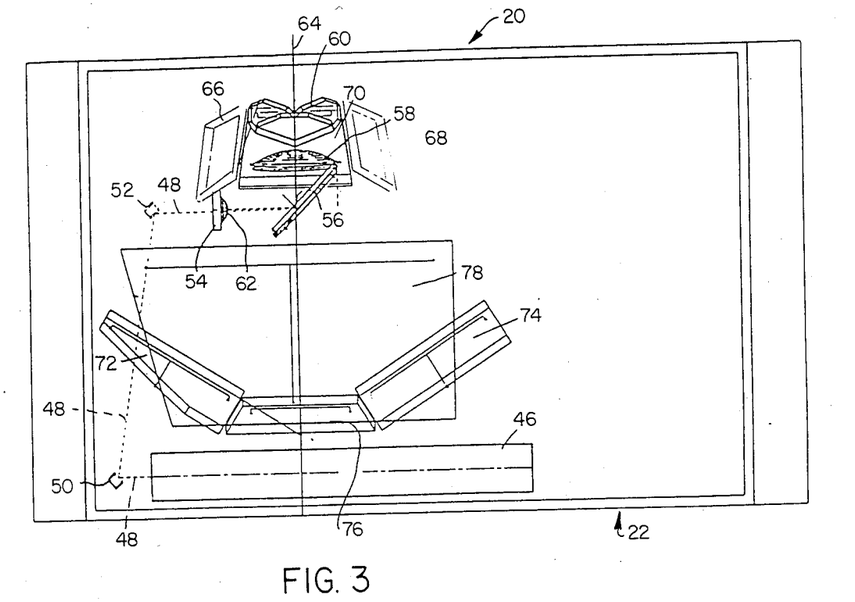
FIG. 3 is a schematic view showing generally the layout of a laser and routing mirrors and other optics in a preferred embodiment of the assembly.

In FIG. 3 is shown generally the layout of the optics in the scanner 20, including a laser 46 and a series of beam directing and routing mirrors, as will be explained. The scanner 20 is shown open at the top in FIG. 3 to reveal the optics, and this does not represent the construction of the housing itself.

The laser 46 may be a gas tube type laser, such as a helium neon laser, for producing a 632 nm laser beam 48. As indicated in FIG. 3, the beam 48 emerges from the laser tube and is reflected off a first beam directing mirror 50, then off a second, similar beam directing mirror 52 and over the top of a photodetector assembly 54. The beam 48 next strikes an obliquely angled collection mirror 56 and passes through a collection lens 58, preferably a bifocal lens, before impinging on a rotating polygon mirror 60.

As explained in greater detail in co-pending abovereferenced application Ser. No. 06/907,292 filed Sept. 12, 1986, the laser beam is then reflected by the rotating polygon mirror 60 off a plurality of beam routing mirrors in such a way as to form a preferred scan pattern geometry, which may be "five-apparent-source" scan geometry (five apparent sources for each facet of the rotating polygon mirror). The polygon mirror 60, as described in the co-pending application, may be a three-faceted rotating mirror.

The bifocal lens 58, indicated only schematically in FIG. 3 but described in greater detail in the above-referenced co-pending application, includes two lens elements: a first, small convex lens element for helping converge the laser beam 48 on its path toward the rotating polygon mirror 60; and a second large convex collecting lens element essentially the size of the entire bifocal lens 58, for re-focussing the returning collected light from a bar code after it has been reflected back by the rotating polygon mirror 60 as a relatively large-volume, diverging beam. The small lens is built into the larger lens. The large lens element focuses the large-volume returning beam toward the photodetector assembly 54, where it passes through a meniscus lens 62 for focussing onto the photodetector. The angled collection mirror 56 reflects the returning collected beam from the bifocal lens 58 toward the photodetector.

As indicated in the drawings, the rotating polygon mirror 60 rotates about an axis 64 which is oriented on a slightly downward tilt into the housing. As described in the referenced co-pending application Ser. No. 06/907,292 the downward tilt angle may be, in a preferred embodiment, approximately 11° from horizontal.

The beam routing mirrors reflect the scanning beam three times before it exits the housing, for each scan line. These routing mirrors, whose position and function are fully described in the referenced co-pending application, include a pair of vertical mirrors 66 and 68 positioned on either side of the polygon mirror 60 and obliquely angled as to both the horizontal and vertical directions, and a folding mirror 70 positioned in an angled roof-like position with respect to the polygon mirror 60.

In addition, the beam routing mirrors include a pair of pattern mirrors 72 and 74 positioned at left and right across the housing from the three routing mirrors 68–70, a center horizontal mirror 76 positioned between the pattern mirrors, and a final routing mirror 78 positioned generally at the floor of the scanner housing, and off which all scan lines are reflected immediately before exiting the housing through the window assembly.

Figure 4:
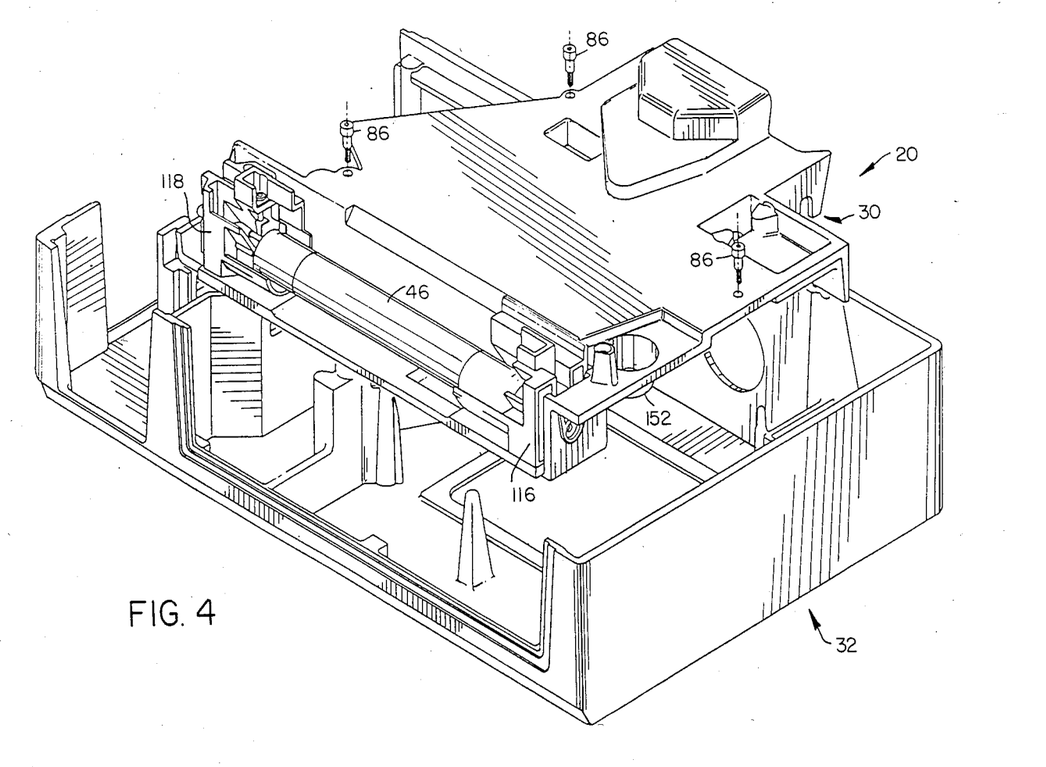
FIG. 4 is an exploded view in perspective, with the scanner inverted, showing a main or upper casting of the housing assembly below a platform or lower casting, and indicating the manner of assembly.

FIG. 4 indicates, partially schematically with not all parts shown, the upper and lower castings 32 and 30 inverted and in exploded view, indicating the assembly of the two together. The platform or lower casting 30 has mounted on it the laser 46, as shown, as well as the final routing mirror 78, the beam directing mirrors 50 and 52, the collection mirror 56, the bifocal lens 58, and the meniscus lens 62/photodetector assembly 54, all of which are not shown in FIG. 4. The lower casting 30 is shown in top plan view in FIG. 7.

It is an important feature of the invention that each of the beam routing mirrors (as listed with reference to FIG. 3) are permanently affixed to either the lower casting 30 or the upper casting 32. Thus, each beam routing mirror, such as the final routing mirror 78 shown in FIG. 7, must be precisely oriented as to position and angle of its planar surface with respect to the casting upon which it is mounted, and it is equally important that the two castings must be assembled together precisely as to both position (i.e. with respect to relative sliding movement) and as to tilt. The achievement of this precise mirror and housing location and orientation, as well as the manner in which this is achieved, are important features of the invention. These features cooperate with the limitation of the principal housing elements to only two castings which support all beam routing mirrors.

Figure 5:
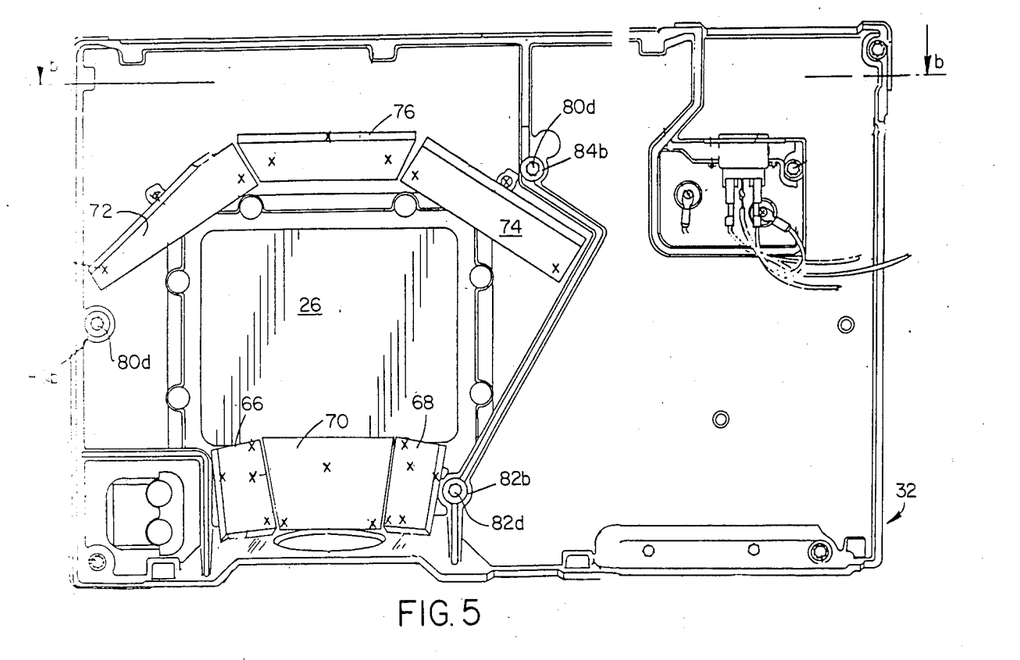
FIG. 5 is a bottom plan view of the main or upper casting.
Figure 6:
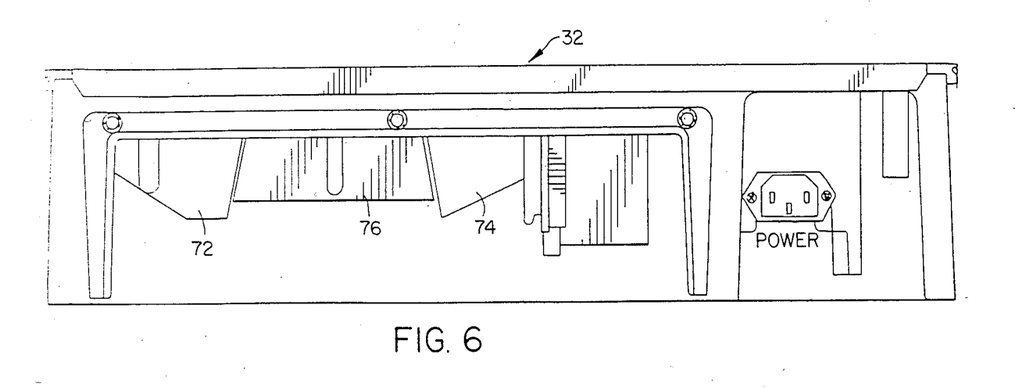
FIG. 6 is a sectional elevation view of the main casting, as seen along the line 6—6 in FIG. 5, but shown in upright position.
Figure 7:
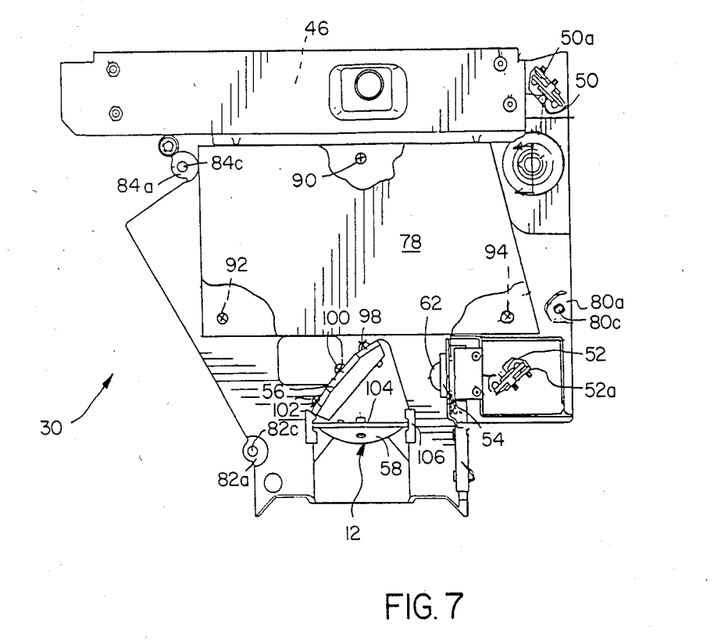
FIG. 7 is a top plan view of the platform or lower casting.

With reference to all of FIGS. 4, 5, 6 and 7, the preferred manner in which the two castings 30 and 32 (the main casting 32 being shown in FIGS. 5 and 6) are closely registered together is by the provision of three precise casting contact points 80a, 82a and 84a on the platform casting 30 and corresponding points 80b, 82b and 84b on the main casting 32, as indicated particularly in FIGS. 5 and 7. These three points on each casting may be machined or precisely cast flat areas as indicated.

The three-point contact arrangement described will precisely orient the two castings at least with respect to relative tilt of the castings. In conjunction with this three-point contact there must be provided a means for securing the castings together and a means for precisely registering the two castings with respect to relative sliding movement between the two. If the three-point contacts are simply flat areas as described at least two position locators must be provided between the castings, to secure their relative positions with respect to relative sliding and rotational movement. These registering devices need not be integral with the three points of contact, but in accordance with the invention they comprise, on the platform casting 30, bores 80c, 82c and 84c of precise diameter and on the main casting threaded bores 80d, 82d and 84d also with precise-diameter portions, to be connected together by shoulder bolts 86 with precise diameter shoulders as indicated in FIG. 4. In this way, the two castings are precisely located by the shoulder bolts in the bores 80c, 82c and 84c, and at the same time the two castings are secured together.

Figure 8:
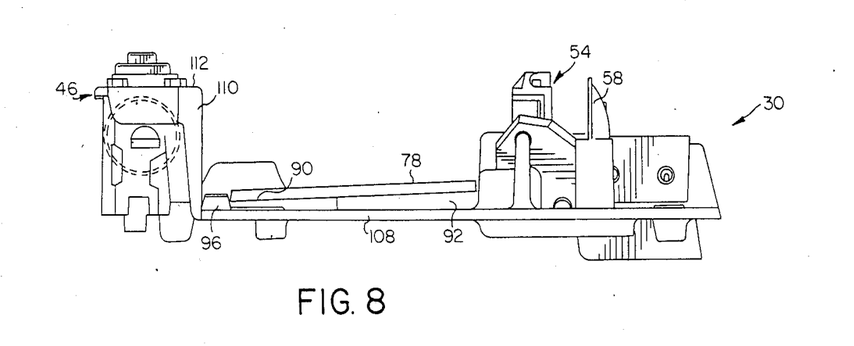
FIG. 8 is a side elevation view of the platform or lower casting.
Figure 9:
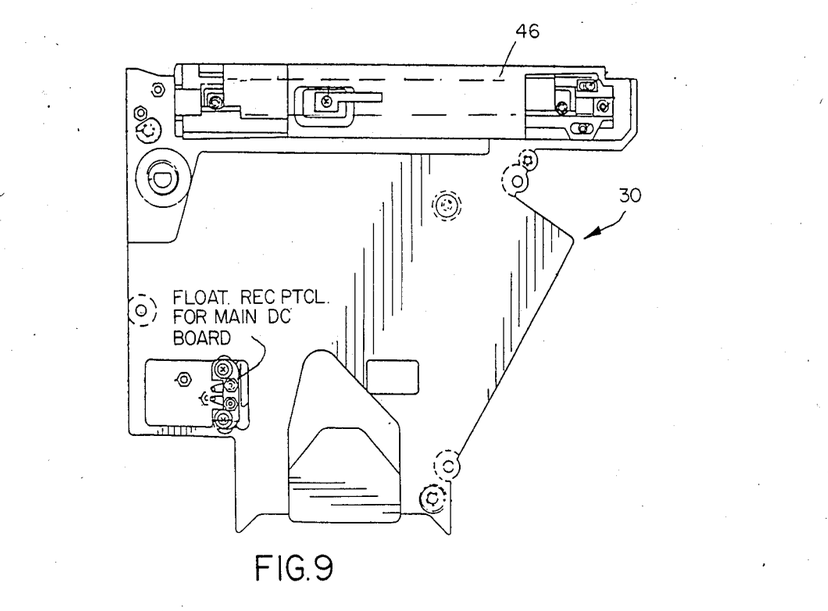
FIG. 9 is a bottom plan view of the platform or lower casting.

As mentioned above, the beam routing mirrors 66-78 are each precisely located as to position and as to angular orientation on one of the two castings 30 and 32. With reference to FIGS. 7 and 8, the final routing mirror 78 is shown along with a preferred manner in which it is located and bonded to the casting 30. Each mirror is located and mounted by spherical ball type locators, such as locators 90, 92, and 94 as shown in FIGS. 7 and 8 for the final routing mirror 78. These "spherical ball" locators in accordance with the preferred embodiment are integrally cast bosses or small pedestals formed in the casting, with precisely shaped, rounded heads at their extremities for essentially single-point contact with the back surface of the mirror 78 at each spherical ball head. The heads need not be spherical, but should be rounded or otherwise shaped to form substantially a single point of contact, and the term "spherical ball" is intended herein and in the appended claims to define this type of contacting device generally.

Each mirror is held in place in its three-point contact with these spherical ball locators preferably by means of a fast-curing epoxy, reinforced with a slower curing RTV for long term retention. Other secure and permanent bonding agent may be used.

Another very important feature of the invention is that the three spherical ball locators for each mirror are themselves precisely located, in the manufacture of the platform and main castings 30 and 22, by reference to the three contact points and precision bores 80a-82c, 82a-82c, and 84a-84c. In this way all mirror orientations and locations are fixed with reference to the three datum points 80, 82, and 84 on the two castings, and since the spherical ball locators establish with high precision the location of the mirror plane for each mirror, the mirrors can be assembled into the respective castings and then the two castings assembled together without any need for adjustment of the routing mirrors.

Where each mirror is located on the spherical ball locators, there may be an additional boss or lip or flange, or more than one such protrusion, for engaging the edge or edges of the mirror to locate the mirror with respect to sliding movement within the mirror's fixed plane. These bosses or protrusions preferably are also integrally cast with the casting. For example, in FIG. 8 the final routing mirror 78 is shown engaging against an integral boss 96 on the casting 30. These bosses or protrusions such as the protrusion 96 are important primarily for holding the mirror at the proper position within its plane while the back of the mirror is being bonded to the three spherical ball locators. The bosses or protrusions are not required to be of the precisoon of the spherical ball locators, since the location of the mirror within the mirror plane is not as critical as the location and angular orientation of the mirror plane itself, which are fixed by the three spherical ball locators.

All of the beam routing mirrors of the system of the invention, i.e. the mirrors 66, 68, 70, 72, 74, 76 and 78, are retained in place in the respective castings by the three-point spherical ball retention arrangement. In the preferred embodiment, the collection mirror 36 is also retained in position by three-point spherical locators, indicated generally in FIG. 7 as 98, 100 and 102.

Other optical components, such as the beam directing mirrors 50 and 52 for directing the beam from the laser 46 to its first reflection off the collection mirror 56, may be retained on the platform casting 30 by mechanical retention, such as by the screw-adjustable mechanical retainers indicated at 50a and 52a. Similarly, the meniscus lens 62 and the photodetector assembly 54 may be retained mechanically and adjustably on the platform casting 30. Adjustments to these mirrors and the photodetector assembly can be made on the lower casting 30 with the laser powered, prior to assembly of the two castings together.

The collection lens 58, preferably a bifocal lens as described, preferably is fixed in position upon assembly of the platform casting, again by a permanent bonding agent. However, this may be by means of a different type of three-point contact, by bonding the mirror where its bottom contacts the casting (indicated generally at 104 in FIG. 7) and at two channel-like vertical retainers 106, as also seen in FIG. 7.

Figure 11:
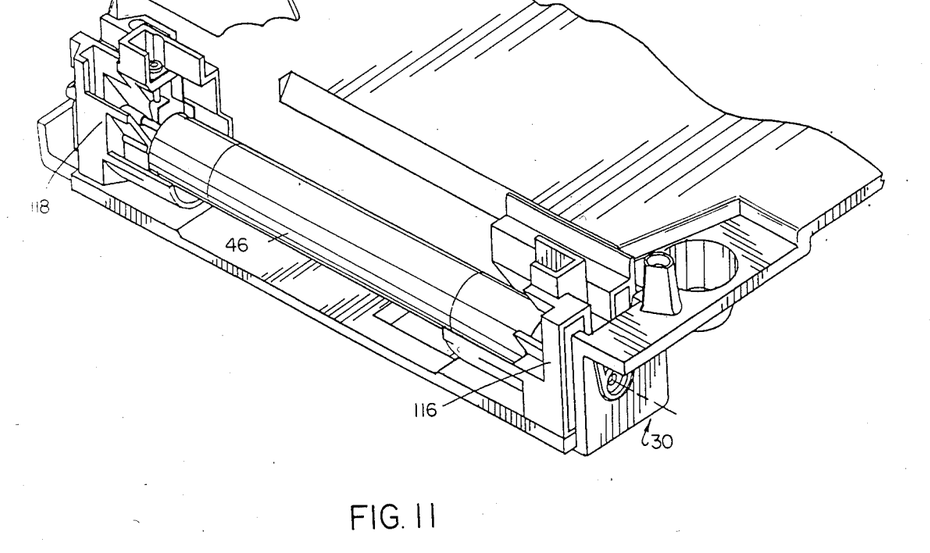
FIG. 11 is a perspective view showing the platform or lower casting, in inverted position, and showing the laser retained in place.
Figure 12A:
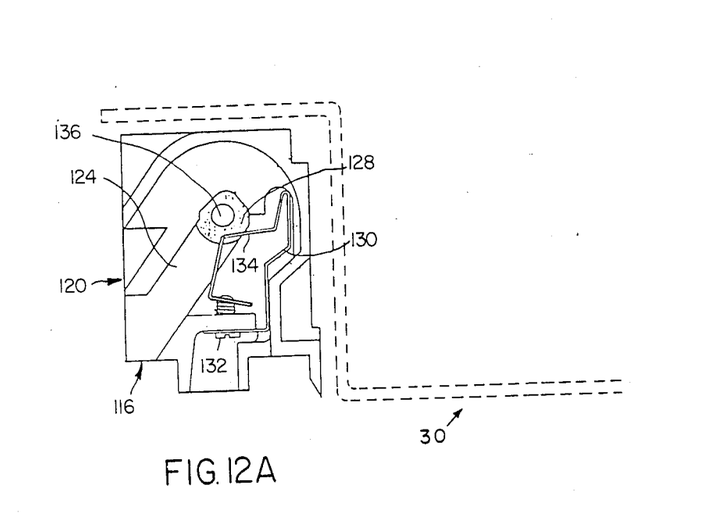
FIGS. 12A and 12B are detail views showing laser retention clips for holding the laser in place and connected, as shown in FIG. 11.
Figure 12B:
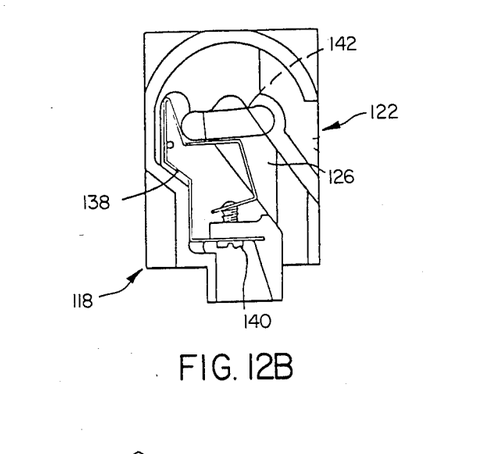

The retention of the laser 46 within the scanner housing, preferably within the platform or lower casting 30 as described, is best understood with reference to FIGS. 7, 8, 9, 11, 12a and 12b. FIGS. 7 and 8 show that the lower casting 30 has a structural floor 108 which, at a downstream end of the housing, is integrally connected with an upwardly extending generally vertical wall 110 which forms the rear or trailing end boundary of the optics cavity. This wall 110 is integrally connected to a generally horizontal flange or extension 112, so that a space or cavity is formed behind the optics cavity for retention of the laser 46 (indicatd in dashed lines). FIG. 11 also shows the position of the laser 46 in the lower casting 30 (with the lower casting fragmented and inverted). FIGS. 12A and 12B show a pair of laser mount devices 116 and 118, also seen in FIG. 11, for holding the front and rear ends of the laser 46 in place, respectively. The front mount 116 is shown in inside elevation view, i.e. as seen from within the laser retention cavity, in upright position. FIG. 12B is a view of the rear end clip 118 looking in the opposite direction, again from within the laser retention cavity.

Figure 10:
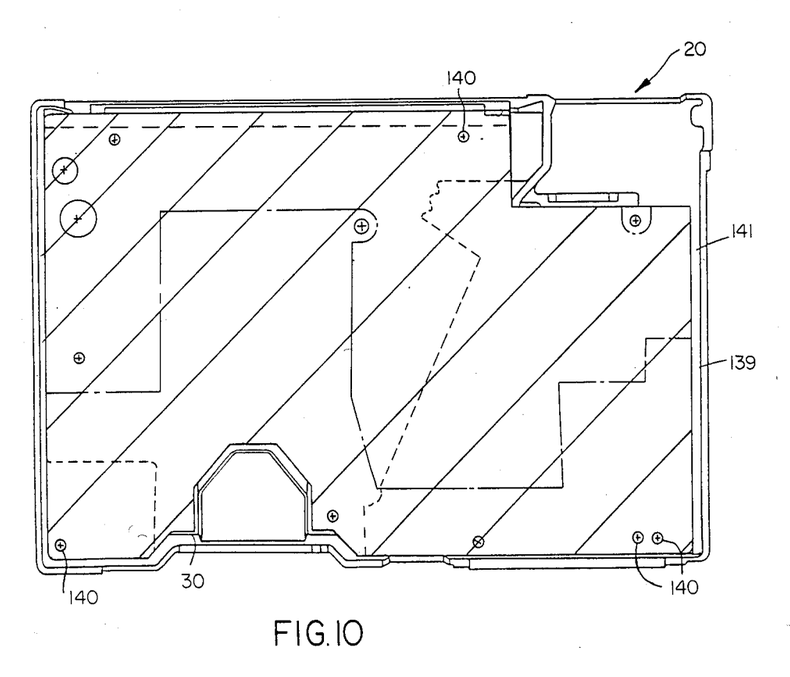
FIG. 10 is a another bottom view of the platform casting, showing a main printed circuit board and high voltage shield in place on the bottom of the lower casting.

The laser mount devices 116 and 118 are held within the laser retention space of the lower casting 130 by suitable fasteners (not shown). On each of the mounts 116 and 118, there is an open side 120, 122 from which the laser is received and from which it is quickly and readily removed and replaced. Both of the laser mounts 116 and 118 include an obliquely angled channel or slot 124, 126, oriented with an open end downward and outward as indicated. The front laser mount 116 has a compressible dust seal 128 in position to receive the laser end window at the beam output end of the laser. A spring clip 130 of conductive metal is positioned to engage an electrical contact at the anode end of the laser, and its position and engagement with the laser contact is controlled by the position of a screw 132 as indicated, accessible from the bottom of the scanner housing. When the screw 132 is fully tightened, as indicated in FIG. 12A, a portion 134 of the conductive metal spring clip 130 springingly engages tightly against the external electrical contact at the anode end of the laser (laser not shown in FIG. 12A) to make good electrical contact. Preferably, the screw 132 comprises a "banana jack" type screw, the head of which is centrally recessed and serves as a socket for an electrical contact plug from the main printed circuit board, which is positioned against the bottom of the lower casting 130 as assembled, as indicated in FIG. 10.

The compressible dust seal 128 engages the laser window, sealing against the entry of dust against the laser window. A center opening 136 of the dust seal 128 is optically open, leading to the first beam directing mirror 50 shown in FIG. 7.

As shown in FIG. 12B, the rear laser mount 118 is in general similarlly constructed to the front laser mount 116. The principal difference is that the rear laser mount has no optical opening or compressible dust seal as does the front laser mount.

The rear mount includes an electrical contact spring 138, the position and pressure of which are controlled by a banana jack screw 140 as in the front mount. This spring contact 138 bears against the cathode end of the laser, a portion 142 of which is seen in dashed lines in FIG. 12B, the portion 142 including a cathode electrical contact positioned to be engaged by the contact spring 138.

When the laser is installed in the scanner (see FIGS. 11, 12A and 12B), the two banana jack screws 132 and 140 of the laser mounts 116 and 118 are first loosened. The front or window end of the laser is then carefully positioned against the compressible dust seal 128 of the front laser mount 116, by moving the window directly into contact with the dust seal 128, rather than sliding it down the channel 124. Then the cathode end 142 is moved up the open channel 126 of the rear mount 118 with the end 142 rotationally oriented so as to permit it to move up the width of the channel. The end portion is then rotated into the orientation shown in FIG. 12B. Next, both banana jack screws 132 and 140 are tightened down, so as to bring the electrical contact springs 130 and 138 into springing engagement with the respective contacts on the laser.

FIG. 10 shows the assembled scanner housing 20 in bottom plan view, but with a bottom panel omitted to show the connection of a main printed circuit board 139 on the bottom of the scanner. The main printed circuit board 139 may be retained in place by a number of screws 140 which connect into the platform or lower casting 30 as indicated. The circuitry of the main printed circuit board is on the upper side, oriented toward the interior of the scanning housing 20, and immediately above the circuit board 139 it is positioned a high voltage shield 141 to insulate high voltage portions of the crrcuit board from metal components of the housing.

Figure 13:
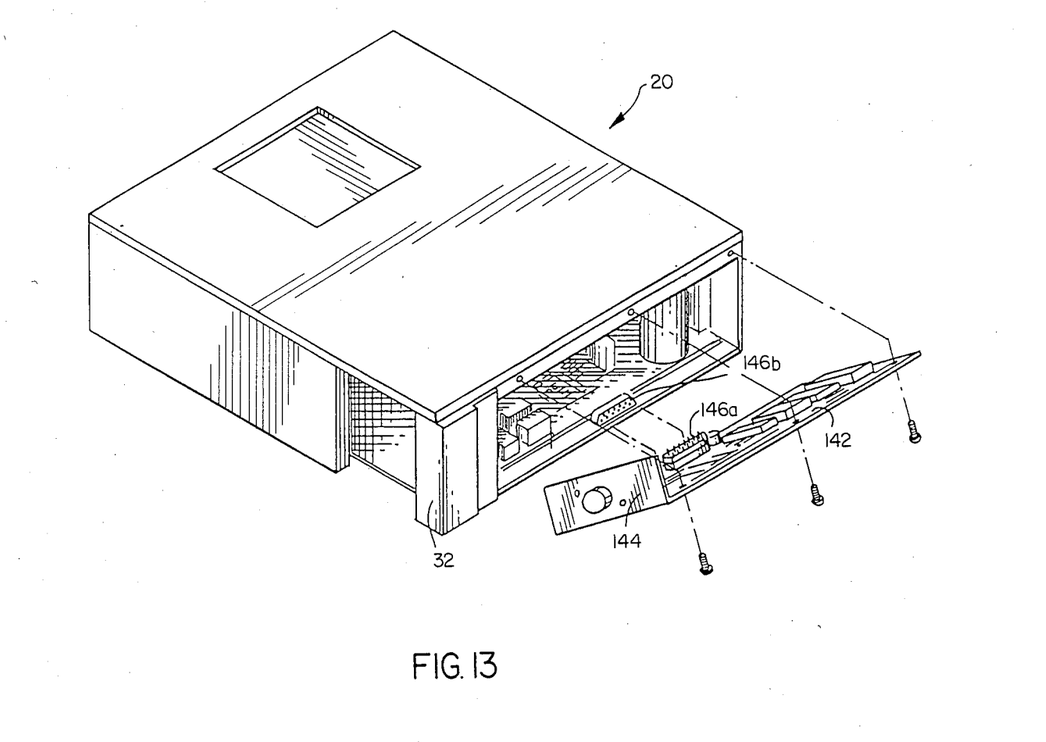
FIG. 13 is a perspective, partially exploded view showing a digital interface board and its interchangeability in the otherwise assembled scanner.

FIG. 13 is a partially exploded perspective view showing a digital interface board 142 of the scanner 20 and its manner of assembly into the scanner.

As shown in FIG. 13, the digital interface board 142, which provides appropriate interfacing with the cash register or other data terminal to which the scanner 20 is connected, is mounted on a housing panel 144 which is easily removed from the side of the main casting 32, by removing several bolts or screws. As shown in FIG. 13, a two-part pin connector 146a, 146b is mounted on the interface board 142 and the main printed circuit board 139 such that the two parts are easily connected when the panel 144 is replaced back onto the housing 20. The part 146a of the pin connector is mounted on the printed circuit board at right angles, and the other pin connector part 146b is accordingly mounted on the main printed circuit board in parallel relationship, so that when the interface board 142 is reassembled on the housing, the two boards are at right angles to each other and the pin connection is made.

Figures 14, 15:
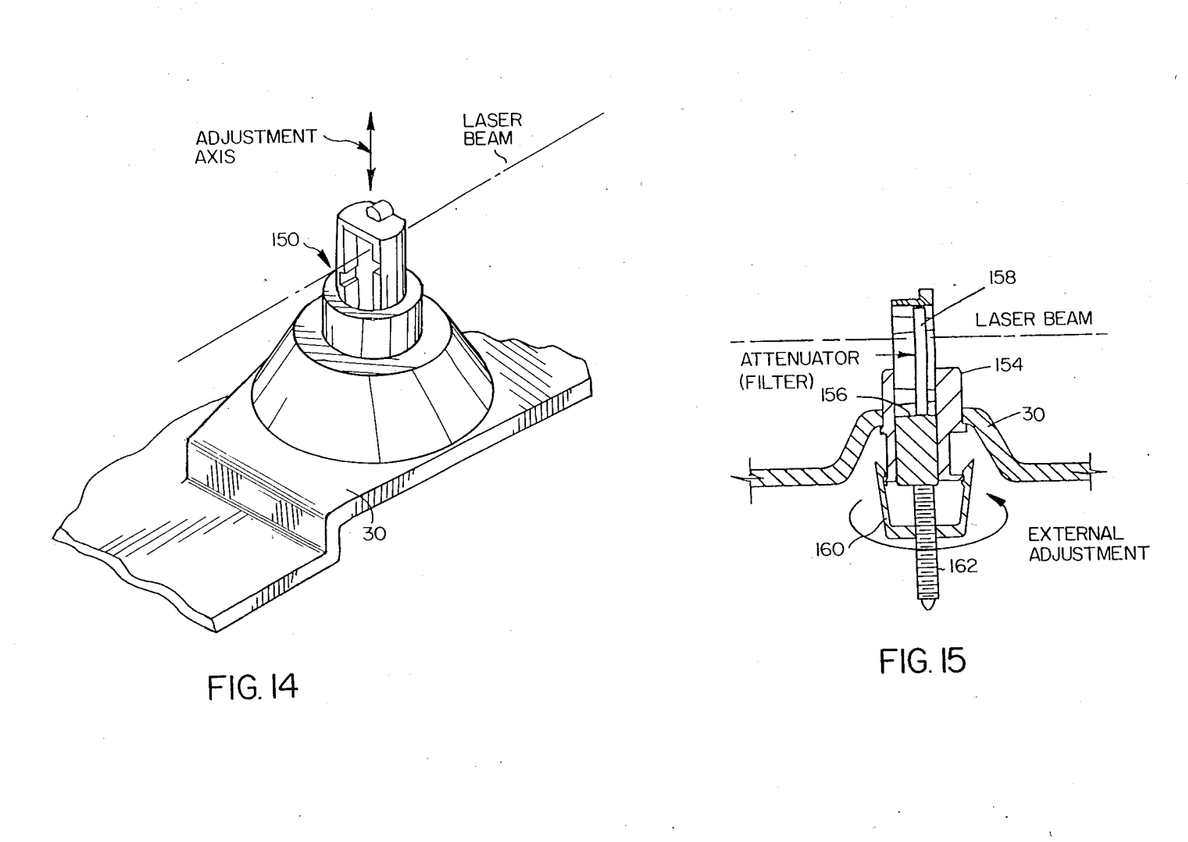
FIGS. 14 and 15 are detail views in perspective and in cross section, showing a laser beam power attenuator which, as assembled in the platform, allows beam power adjustment from the outside of the assembled housing.

FIGS. 14 and 15 show a laser beam power attenuator assembly 150 as installed in the bar code scanner in accordance with the invention. The attenuator assembly, shown in the upright position in a portion of the lower or platform casting 30, is located near a corner of the lower casting 30, in the path of the beam from the laser 46. As shown in FIG. 4, the lower casting 30 includes an integral cup-like upwardly extending protrusion 152 with a bore through which the beam attenuator assembly 150 extends (the beam attenuator is not installed in FIG. 4).

The beam attenuator 150, as shown in FIGS. 14 and 15, comprises a plastic body 154 sealingly bonded into the casting 30, with an inner slidable member 156 which supports an beam attenuator element 158. The element 158 is a density-graduated filter which increase in density toward one end, so that, when a nut member 160 is manually rotated from the exterior (below) of the scanner 20, it moves a threaded stud 162 and the inner member 156 and attenuator element 158 up or down. This enables the laser beam to be attenuated to meet appropriate safety standards, from outside the assembled scanner 20.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A bar code scanner housing construction in a scanner of the type which produces multiple intersecting laser scan lines from a series of apparent sources, and which includes a rotating mirror and a series of internal beam routing mirrors which are fixed and non-adjustable, comprising:

only two castings to which all the beam routing mirrors are secured, the two castings being a platform or bottom casting and a main or upper casting securable together by removable fasteners;

each casting having three-point spherical ball locating means for locating the plane of each beam routing mirror on the casting, with the back side of the beam routing mirror being bonded to the spherical ball locating means;

the two castings each including three contact points located for contact with complementary contact points similarly located on the other casting, for precisely locating the two castings together with respect to tilt orientation;

and including position locating means for precisely locating the two castings together with respect to relative slidable positioning of the two castings in a plane containing the three contact points.

2. The bar code scanner housing construction of claim 1, wherein the position locating means are associated with the contact points on the two castings.

3. The bar code scanner housing construction of claim 1, wherein the position locating means comprise shoulder bolts serving as said removable fasteners, with precision-diameter shoulders on the shoulder bolts and with precision-diameter bores in both castings for closely receiving each shoulder bolt.

4. The housing construction of claim 1, wherein the rotating mirror is mounted in the main casting and wherein the beam routing mirrors include: left and right vertical mirrors and a folding mirror near the rotating mirror, and left and right pattern mirrors and a center horizontal mirror spaced across from the rotating mirror, all fixed in the main casting; and a final routing mirror fixed to the platform or bottom casting.

5. The housing construction of claim 4, further including a collection mirror fixed to the platform or bottom casting, positioned to direct a laser beam toward the rotating mirror and to receive and redirect collected light reflected off the rotating mirror, the collection mirror being mounted on said three-point spherical ball locating means.

6. The housing construction of claim 1, wherein the three-point spherical ball locating means are integral with the castings.

7. The housing construction of claim 1, including a laser positioned in the platform or lower casting.

8. The housing construction of claim 7, wherein the lower casting is configured to isolate the laser from the routing mirrors, with a wall of the casting extending between the routing mirrors and the laser and over the laser.

9. The housing construction of claim 8, further including means at the underside of the platform or lower casting for receiving a main printed circuit board, with a high voltage shield received between the bottom of the lower casting and the printed circuit board.

10. The housing construction of claim 9, further including floating receptable means connected to the platform or lower casting, for receiving electrical contacts of the main printed circuit board and for transferring an analog collected light signal to the main printed circuit board.

11. The housing construction of claim 7, wherein the removable fastener at each laser mount comprises a banana jack screw having a head with a central recess forming a socket for receipt of a male contact extending upwardly from the main printed circuit board.

12. The housing construction of claim 9, including means associated with the housing for receiving an interface printed circuit board in a plane generally vertical and at right angles to the main printed circuit board, the main and interface printed circuit boards including pin connector means for electrically connecting the two boards by moving the interface board toward the main printed circuit board and into place in the housing, and including quickly removable fastener means for securing the interface printed circuit board to the housing, whereby the interface board may be quickly changed to accommodate different equipment to which the scanner is to be connected.

13. The housing construction of claim 7, including interchangeable laser mounting means connected to the platform or lower casting for enabling quick removal and replacement of the laser.

14. The housing construction of claim 13, wherein the interchangeable laser mounting means comprises a pair of plastic laser mounts, one at each end of the laser and secured to the lower casting, the mounts providing means for first receiving a beam window end of the laser and then receiving the opposite end in a slot, and including a springable electrical contact at each mount and a removable fastener for tightening each contact against the laser.

15. The housing construction of claim 1, wherein each beam routing mirror is bounded to the spherical ball locating means with a fast curing epoxy and reinforced with a slower curing RTV for long-term retention.

16. The housing construction of claim 1, including a top deck which is substantially flat and flush, associated with the main casting, and including a scan window assembly in the top deck and through the main casting through which the scan lines emanate from the scanner.

17. The housing construction of claim 16, wherein the window assembly includes a lower window of plastic and an upper window of glass, with window sealing means sealing both windows with respect to the main casting.

18. The housing construction of claim 17, wherein the window assembly includes gasket means for friction retention of the upper window in place and for permitting the upper window to be replaced by pulling it upward and pushing a new upper window down into place against the gasket means.

19. The housing construction of claim 16, wherein the window assembly is optically open and slotless.

20. The housing construction of claim 16, wherein the top deck includes a flat plastic deck cover over the main casting, with an opening for the scan window.

21. The housing construction of claim 20, including a series of threaded fasteners around the window assembly retaining the plastic deck cover to the main casting, whereby the plastic deck cover is permitted to thermally expand and contact differentially from the main casting.

22. The housing construction of claim 1, further including means in the platform or lower casting for receiving an externally adjustable beam attenuator positioned in the path of the beam, whereby beam power in the scan lines can be adjusted after assembly of the two castings together.

23. A method for constructing a shallow profile bar code scanner for generating multiple apparent source geometry, including the steps of:

providing a platform or bottom casting,
　providing a main or upper casting,
　providing a series of beam routing mirrors for routing a laser beam in an arc, through multiple reflections off the routing mirrors to form scan fans that exit the scanner,
　securing all beam routing mirrors to one or the other of the two castings, and precisely locating each of hhe beam routing mirrors by reference to three contact points and position locator points on the respective casting, each casting including points complementary to the other,
　assembling other optical elements onto at least one of the castings, and
　assembling the two castings together with contact at the three contact points to establish precise relative positioning with respect to tilt, and locating the two castings with respect to relative shifting using the position locator points,
　whereby all beam routing mirrors can be precisely located in position and orientation with respect to each other before assembly of the two castings together, avoiding any need to adjust the beam routing mirrors on or after assembly.

* * * * *